US010581047B2

United States Patent
Park et al.

(10) Patent No.: US 10,581,047 B2
(45) Date of Patent: Mar. 3, 2020

(54) ALL-SOLID BATTERY AND METHOD FOR MANUFACTURING THE SAME

(71) Applicants: Hyundai Motor Company, Seoul (KR); Kia Motors Corporation, Seoul (KR)

(72) Inventors: Sang Jin Park, Gyeonggi-do (KR); Jung Young Cho, Seoul (KR); Sung Min Choi, Gyeonggi-do (KR); Shin Kook Kong, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 282 days.

(21) Appl. No.: 15/830,612

(22) Filed: Dec. 4, 2017

(65) Prior Publication Data

US 2019/0131603 A1    May 2, 2019

(30) Foreign Application Priority Data

Oct. 31, 2017  (KR) ........................ 10-2017-0143166

(51) Int. Cl.
| | | |
|---|---|---|
| H01M 2/14 | (2006.01) | |
| H01M 2/16 | (2006.01) | |
| H01M 10/0525 | (2010.01) | |
| H01M 10/0585 | (2010.01) | |
| H01M 10/0562 | (2010.01) | |
| H01M 10/04 | (2006.01) | |
| H01M 10/42 | (2006.01) | |

(52) U.S. Cl.
CPC ......... *H01M 2/1653* (2013.01); *H01M 2/145* (2013.01); *H01M 10/0486* (2013.01); *H01M 10/0525* (2013.01); *H01M 10/0562* (2013.01); *H01M 10/0585* (2013.01); *H01M 2010/4292* (2013.01); *H01M 2220/20* (2013.01)

(58) Field of Classification Search
CPC .............. H01M 2/145; H01M 2/1653; H01M 10/0525; H01M 10/0585; H01M 10/0562; H01M 10/0468; H01M 2220/20; H01M 2010/4292

See application file for complete search history.

(56) References Cited

FOREIGN PATENT DOCUMENTS

| | | |
|---|---|---|
| JP | 2015-076272 A | 4/2015 |
| JP | 2015-125893 A | 7/2015 |

*Primary Examiner* — Brittany L Raymond
(74) *Attorney, Agent, or Firm* — Mintz Levin Cohn Ferris Glovsky and Popeo, P.C.; Peter F. Corless

(57) ABSTRACT

Provided are a method of manufacturing an all-solid battery and an all-solid battery manufactured by the method. The all-solid batter may have edge portions that can be more effectively insulated. In particular, the all-solid battery may include a cathode layer, an anode layer, and an electrolyte layer, a first insulator disposed at an edge of the cathode layer and a second insulator disposed between the cathode layer and the first insulator, thereby forming a membrane of the second insulator for preventing contact between the cathode layer and the anode layer in pressing.

19 Claims, 9 Drawing Sheets

ALL-SOLID BATTERY AND METHOD FOR MANUFACTURING THE SAME

CROSS-REFERENCE TO RELATED APPLICATION

This application claims under 35 U.S.C. § 119(a) the benefit of priority to Korean Patent Application No. 10-2017-0143166 filed on Oct. 31, 2017, the entire contents of which are incorporated herein by reference.

TECHNICAL FIELD

The present invention relates to an all-solid battery and a method for manufacturing the all-solid battery.

BACKGROUND

With the development and spread of vehicles using electric energy, secondary batteries having enhanced safety have been increasingly popularized. A commercialized lithium-ion secondary battery includes a liquid electrolyte that is volatile and vulnerable to heat, so high energy density is increasingly required for the lithium-ion secondary battery. Accordingly, the lithium-ion secondary battery always has a possibility of ignition and explosion. Accordingly, an all-solid battery that has a less possibility of explosion and high thermal safety has been popularized.

In the related art, pressing is applied to the process of manufacturing an all-solid battery to improve contact between an electrolyte and electrodes, but edges of the electrodes may break during the pressing under high pressure, which may cause a short-circuit the battery. Accordingly, it may be required to secure insulation at the edges of an all-solid battery in the manufacturing process.

In the related art, for example, a technology of inserting an insulator in edges has been disclosed for securing insulation at edges of an all-solid battery has been disclosed. However, there may be a problem even in this case that edges may break and the insulators may be broken when a battery is pressed in the manufacturing process. Further, a solid electrolyte layer may flow into a space between the insulator and a cathode, whereby the solid electrolyte layer may collapse. Accordingly, short-circuit problem at the edge may not be fundamentally solved only by inserting an insulator.

SUMMARY OF THE INVENTION

In preferred aspects, the present invention may provide a method of manufacturing an all-solid battery and an all-solid battery manufactured by the method to effectively insulate edges of an all-solid battery.

The term "all-solid battery" as described herein refers to a cell or a battery that includes only solid or substantially solid-state components, such as solid state electrodes (e.g. anode and cathode) and solid electrolyte. Thus, in preferred aspect, an all-solid battery will not include a fluid and/or flowable electrolyte component as material.

In one aspect, provided is a method of manufacturing an all-solid battery. The method may include: forming a cathode layer; forming an anode layer having an area greater than an area of the cathode layer; forming a solid electrolyte layer between the cathode layer and the anode layer; disposing a first insulator at the outer side or edge of the cathode layer; disposing a second insulator between the cathode layer and the first insulator; forming a battery cell by stacking the cathode layer, the anode layer, the solid electrolyte layer, the first insulator, and the second insulator; and forming a membrane of the second insulator between the cathode layer and the first insulator by pressing the battery cell. In certain preferred aspects, an anode layer may have an area that is at least about 1, 2, 3, 4, 5, 8, 10, 15, 20 or 25 percent larger, or 30, 40 or 50 percent larger than an area of the cathode layer The "area" of the cathode or the anode, as used herein, are meant by a surface area that may be in contact with the solid electrolyte along the stacking direction. For instance, the area of the cathode is meant by a surface area that may a make contact with a first side of the solid electrolyte and the area of the anode is meant by a surface of the anode that may make a contact with a second side of the solid electrolyte.

Preferably, the second insulator may suitably be in contact with the first insulator, the cathode layer, and the solid electrolyte layer.

Preferably, a gap may exist or be present between the first insulator and the outer side or edge of the cathode layer, and the at least a portion of the second insulator may flow into the cap when the battery cell is pressed. A suitable gap between the first insulator and the edge of the cathode layer may be formed to be, for example, at least between about [0.1] mm and [3.0] mm, typically between about [0.1] mm and [1.0] mm. The second insulator may comprise a second insulating material, which may be formed in a slurry or a tape. The second insulator may be disposed by applying a slurry including the second insulating material between the cathode layer and the first insulator. Alternatively, the second insulator formed in a tape may be attached between the cathode layer and the first insulator. For example, the "tape" as used herein is meant by a thin, flexible layer having a substantial extended length that may wrap or cover other surfaces.

The second insulator may include the second insulating material having a melting point less than a melting point of the first insulator and a transition temperature less than a transition temperature of the first insulator. For example, the melting point of the first insulator may be greater than about 700° C., or range from about 100° C. to about 800° C., or from about 200 to about 750° C. Moreover, the melting point of the second insulator may be greater than about 50° C., or preferably, range from about 50° C. to about 200° C.

The first insulator may suitably include polyimide and the second insulator may suitably include polyethylene oxide (PEO), polyvinylidene fluoride (PVDF), or a polyvinylidene fluoride copolymer.

Preferably, the battery cell may be pressed at a temperature less than the melting point of the second insulator and greater than a transition temperature of the second insulator. For example, the pressing temperature may be less than the melting point of the second insulator by about 5° C. or greater, by about 10° C. or greater, by about 15° C. or greater, by about 20° C. or greater, by about 30° C. or greater, by about 40° C. or greater, or by about 50° C. or greater. In addition, the pressing temperature may be greater than the transition temperature of the second insulator by about 5° C. or greater, by about 10° C. or greater, by about 15° C. or greater, by about 20° C. or greater, by about 30° C. or greater, by about 40° C. or greater, or by about 50° C. or greater.

Alternatively, the battery cell may be pressed at a temperature greater than the melting point of the second insulator.

The second insulator may suitably be a polymer having a melting point of about 90° C. to 200° C. and the second insulator may be pressed by cold isostatic pressing at room temperature. In addition, the second insulator may suitably be a polymer having a melting point of about 60° C. to 90° C. and the battery cell may be pressed by hot isostatic pressing at a temperature of about 90° C. or greater or warm isostatic pressing at a temperature of about 90° C. or less.

In one aspect, provided is an all-solid battery including a cathode layer, an anode layer having a larger area than the cathode layer, a solid electrolyte layer between the cathode layer and the anode layer, a first insulator disposed at an outer side or edge of the cathode layer, and a second insulator disposed between the cathode layer and the first insulator. In particular, the cathode layer, the anode layer, the solid electrolyte, the first insulator, and the second insulator are stacked to form a battery cell, and a membrane of the second insulator may be formed between the cathode layer and the first insulator by pressing the battery cell.

Preferably, the second insulator may suitably be in contact with the first insulator, the cathode layer, and the solid electrolyte layer.

Preferably, a gap may exist or be present between the first insulator and the outer side or edge of the cathode, and when the battery cell is pressed, the second insulator may suitably be melted and at least a portion of the second insulator may form the membrane by flowing into the gap.

The second insulator may include a second insulating material having a melting point less that a melting point of the first insulator and a transition temperature less than a transition temperature of the first insulator. For example, the melting point of the first insulator may be greater than about 700° C., or range from about 100° C. to about 800° C., or from about 200 to about 750° C. Moreover, the melting point of the second insulator may be greater than about 50° C., or preferably, range from about 50° C. to about 200° C.

The first insulator may suitably include polyimide and the second insulator may suitably include polyethylene oxide (PEO), polyvinylidene fluoride (PVDF), or a polyvinylidene fluoride copolymer.

Preferably, the melting point of the second insulator may be greater than a temperature in pressing and the transition temperature of the second insulator is less than the temperature in the pressing. Alternatively, the melting point of the second insulator may be less than the temperature in the pressing.

Further provided herein is a vehicle that include the all-solid battery as described herein.

Other aspects of the invention are disclosed infra.

According to the present invention, since a cell is manufactured by disposing a first insulator at an outer side or edge of a cathode, disposing a second insulator including a different material near the first insulator and the cathode, and the pressing them, an electrolyte membrane may be prevented from collapsing by pressing and accordingly a short-circuit generated in the battery may be prevented.

Further, since a gap between a first insulator and a cathode may be effectively filled with the membrane of the second insulator, the size and shape of the first insulator may be freely selected.

In particular, since the battery cell may be manufactured by stacking the first insulator and the second insulator and the performing pressing one time with temperature adjusted, productivity may be improved.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DETAILED DESCRIPTION

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprise", "include", "have", etc. when used in this specification, specify the presence of stated features, regions, integers, steps, operations, elements and/or components but do not preclude the presence or addition of one or more other features, regions, integers, steps, operations, elements, components, and/or combinations thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, embodiments of the present invention will be described in detail with reference to accompanying drawings.

In one preferred embodiment, an all-solid battery may be formed by stacking in parallel two or more unit cells each including an anode collector (base), an anode layer 4 on the anode collector 5, a solid electrolyte layer on the anode layer 4, a cathode collector (base), and a cathode layer 2 on the cathode collector 3.

Figure 1:
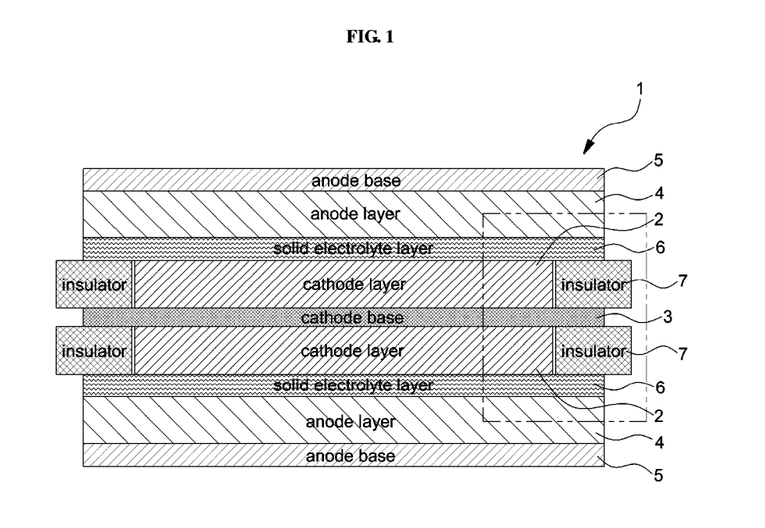
FIG. 1 is a cross-sectional view of an exemplary all-solid battery having insulators at edges according to an exemplary embodiment of the present invention.

An exemplary battery structure is shown in FIG. 1, which shows an example of an all-solid battery 1 having two unit cells stacked in parallel. In particular, in the all-solid battery 1 of FIG. 1, the anode layer 4 may have an area greater than an area of the cathode layer 2 to suppress extraction of lithium and maximize the energy efficiency of the battery and insulating layers may be disposed at the outer side or edges of the cathode layer 2 to solve the problem of a short-circuit at the edges of the battery.

Figure 2:
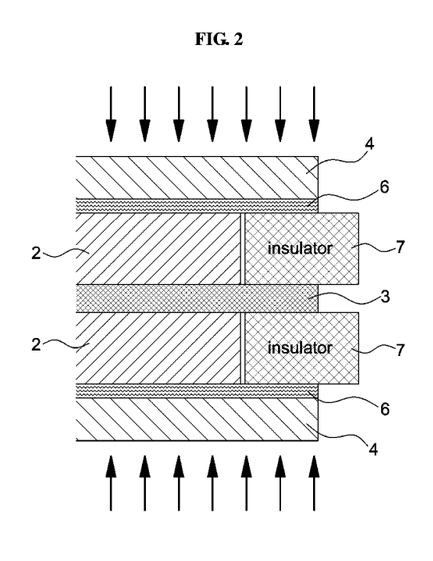
FIG. 2 depicts a portion of an exemplary all-solid battery of FIG. 1 before pressing.
Figure 3A:
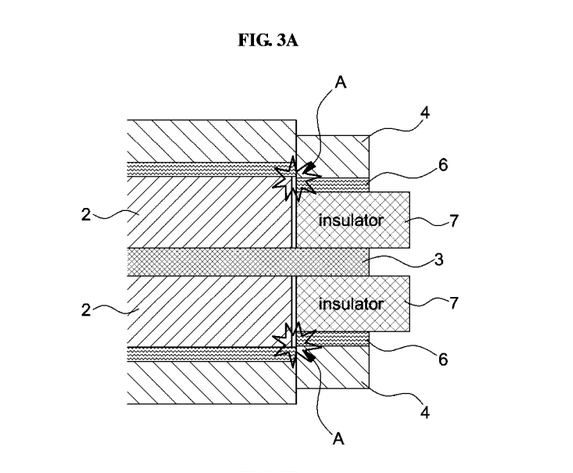
FIGS. 3A and 3B depict a change in an exemplary all-solid battery after pressing.
Figure 3B:
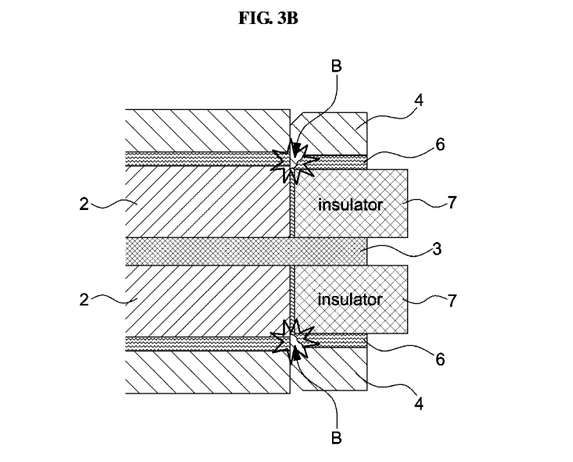
Figure 4:
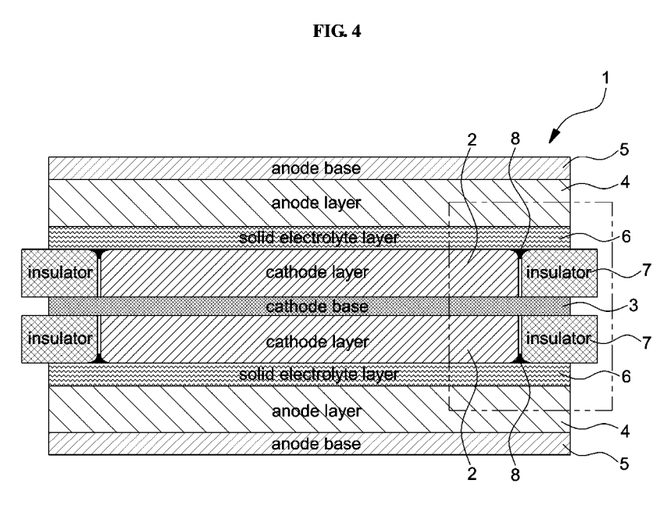
FIG. 4 is a cross-sectional view of an exemplary all-solid battery according to an exemplary embodiment of the present invention.

However, when pressing shown in FIG. 2 is performed on this configuration, the battery structure may be deformed as in FIGS. 3A and 3B and a short-circuit may occur at the edges.

For example, when the battery is pressed, as shown in FIG. 3A, the solid electrolyte layer 6 may collapse and the anode and the cathode may be brought in contact with each other, so a short-circuit may occur at a position A. After pressing, a dislocation (e.g., thickness difference) may exist between the insulator and the cathode, depending on the degree of reduction in thickness of the insulator or the cathode layer 2. In particular, the solid electrolyte layer 6 may collapse due to the dislocation, so the anode layer 4 and the cathode layer may be brought in contact with each other.

Meanwhile, as shown in FIG. 3B, when a gap may be formed between the cathode layer 2 and the insulator, a solid electrolyte may flow into the gap and the solid electrolyte layer 6 may collapse at a position B.

An embodiment of the present invention may be characterized by additionally attaching another insulator at a predetermined position.

Preferably, a battery may further include, in addition to a first insulator 7 disposed at the outer side or edge of the cathode layer 2, a second insulator 8 disposed between the cathode layer 2 and the first insulator 7. Preferably, the second insulator 8 may suitably be disposed in contact with all of the first insulator 7, the cathode layer 2, and the solid electrolyte layer 6. The second insulator 8 may prevent a short-circuit in an exemplary battery by preventing collapse of the solid electrolyte layer 6 between the first insulator 7 and the cathode layer 2.

Preferably, the second insulator 8 may include a material different from that of the first insulator 7. In particular, the first insulator 7 and the second insulator 8 may include electrically non-conductive materials such that the melting point and transition temperature of the second insulator 8 may be less than those of the first insulator 7.

For instance, the first insulator 7 may include a material that does not have electrical conductivity, may have relatively high melting point and transition temperature, and thus, may not be melted or severely deformed at high temperature and high pressure. As consequence, collapse of a solid electrolyte layer due to a dislocation, which is formed between the first insulator 7 and the cathode by deformation of the first insulator in high-pressure pressing, may be prevented. For example, the first insulator 7 may be a film including polyimide, SBR (Styrene-Butadiene Rubber), Nafion (Tetrafluoroethylene), Teflon (Polytetrafluoroethylene, PEFE), PAA (Poly acrylic acid) or PVA (Poly vinyl alcohol).

The second insulator 8 may also include a material that does not have electrical conductivity and may be easily deformed at high temperature and high pressure due to low melting point and transition temperature (Tg). For instance, the second insulator 8 may be suitably deformed at high temperature and high pressure for pressing so that a membrane may be easily formed at a desired position. Preferably, the second insulator 8 may not include fragile glassy polymer, but a flexible crystalline polymer.

Accordingly, the second insulator may include materials that easily form a membrane because it is deformed at high temperature and high pressure such as polyethylene oxide (PEO), polyvinylidene fluoride (PVDF), or a polyvinylidene fluoride copolymer.

The following Table 1 shows a transition temperature and a melting point of materials that can be used for the first insulator 7 and the second insulator 8.

TABLE 1

|  | Polyimide | PEO | PVdF | PVdF-HFP |
|---|---|---|---|---|
| Transition temperature (° C.) | 633~683 | −67 | −40 | −40 or less |
| Melting point (° C.) | 700 or more | 66.2 | 162 | 143 |

Figure 5:
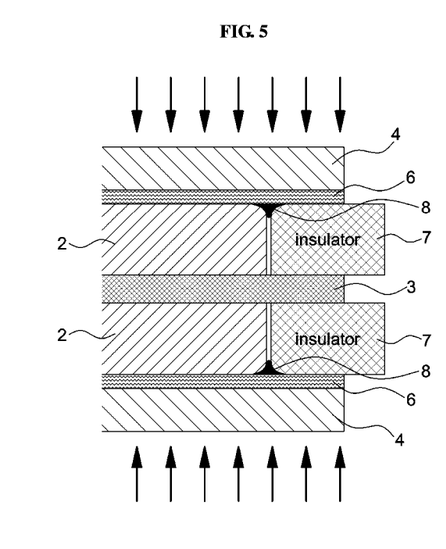
FIG. 5 depicts a portion of the all-solid battery of FIG. 4 before pressing.

The detailed structure of the all-solid battery 1 including the first insulator 7 and the second insulator 8 is shown in FIG. 5 and is the same as the structure of FIG. 1 except for the second insulator 8.

As shown in FIG. 5, the first insulator 7 may be disposed at the outer side or edge of the cathode layer 2 and the second insulator 8 may be disposed between the cathode layer 2 and the first insulator 7, so when the battery is pressed, the second insulator 8 may form a membrane between the cathode layer 2 and the first insulator 7.

An example in which a membrane of the second insulator 8 may be formed in pressing is shown in FIGS. 6A to 6D.

Figure 6A:
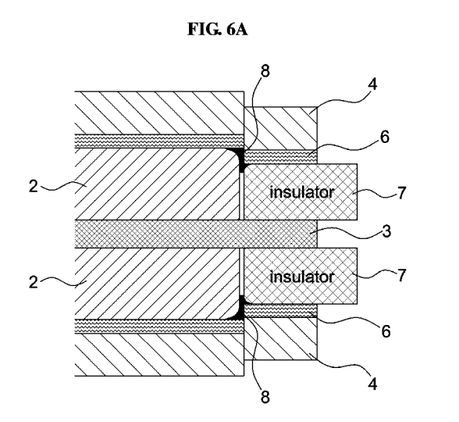
FIGS. 6A and 6B depict changes in the all-solid battery after pressing.

FIG. 6A schematically shows that a membrane of the second insulator 8 may be formed at a collapse position of the electrolyte layer 6 due to dislocation, thereby preventing a short-circuit.

In particular, in an exemplary embodiment of the present invention, during pressing, the second insulator 8 may deform and form a membrane at the joint among the cathode layer 2, the first insulator 7, and the solid electrolyte layer 6.

Accordingly, even if the solid electrolyte layer 6 collapses due to dislocation between the cathode layer 2 and the first insulator 7, the membrane of the second insulator 8 may prevent direction contact between the cathode layer 2 and the anode layer 4, thereby preventing a short-circuit in the battery.

For instance, in the example of FIG. 6, unlike FIG. 3, since the second insulator 8 forms a membrane at the collapse position of the solid electrolyte layer 6, direct contact between the cathode and the anode may be prevented.

Preferably, the second insulator 8 may include a polymer such that the melting point may be greater than the temperature in pressing and the transition temperature may be less than the temperature in pressing.

For example, the temperature range in pressing may be the transition temperature or greater of the second insulator 8 and may be the melting point or less of the second insulator 8. For example, the pressing temperature may be greater than about—30° C. In addition, the pressing temperature may be less than about 60° C. Within these ranges of the temperatures, the second insulator 8 may not be melted and keep the flexible and ductile property of a polymer, such that a membrane may be effectively formed between the cathode and the second insulator.

The second insulator 8 may suitably include polyvinylidene fluoride (PVDF) or a polyvinylidene fluoride copolymer that has a melting point of about 200° C. or less, or particularly of about 90° C. to 200° C. and cold isostatic pressing may be performed at room temperature.

Figure 6B:
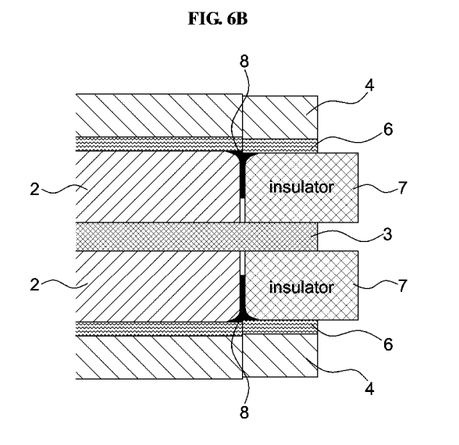

Meanwhile, FIG. 6B shows a gap existing between the cathode layer 2 and the first insulator 7 and the second insulator 8 may function as a membrane preventing the solid electrolyte layer 6 flowing into the gap.

In this case, the melting point of the second insulator 8 may be greater than the temperature in pressing, such that, during the pressing, the second insulator 8 may melt to have fluidity and flow into the gap between the cathode layer 2 and the first insulator 7. Accordingly, the gap may be substantially filled with the second insulator 8, thereby preventing the solid electrolyte layer 6 from collapsing due to the gap.

The second insulator 8 may suitably include a polymer such as polyethylene oxide (PEO) that has a melting point of about 90° C. or less, or particularly of about 60° C. to 90° C., and the pressing may be hot isostatic pressing at a temperature of about 90° C. or greater or warm isostatic pressing at a temperature of about 90° C. or less. Other suitably material for the second insulator may include, for example, trans-1,4-Polyisoprene that has a melting point of about 67° C. or Poly(propylene oxide) that has a melting point of about 76° C.

FIGS. 7A to 7F show steps of an exemplary method of manufacturing the all-solid battery 1 according to an exemplary embodiment of the present invention.

Figure 7A:
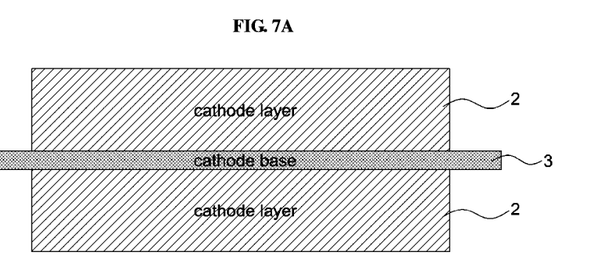
FIGS. 7A to 7F sequentially show each step of an exemplary method of manufacturing an exemplary all-solid battery according to an exemplary embodiment of the present invention.

First, as shown in FIG. 7A, cathode layers 2 may be formed with a cathode collector 3 as a base. The cathode layer 2 may be formed in parallel on both sides of the base.

The cathode layers 2 may be formed by coating a collector made of metal as a base with composite cathode slurry. The composite cathode slurry may include a cathode active material, which may be NCM-based LCO-based, NCA-based, and LFP-based materials that are generally used in secondary batteries.

A cathode composite may suitably be a composite of a cathode active material, a conductive material, and a binder, and preferably, such cathode composite may be coated in a slurry state on the cathode collector 3.

Figure 7B:
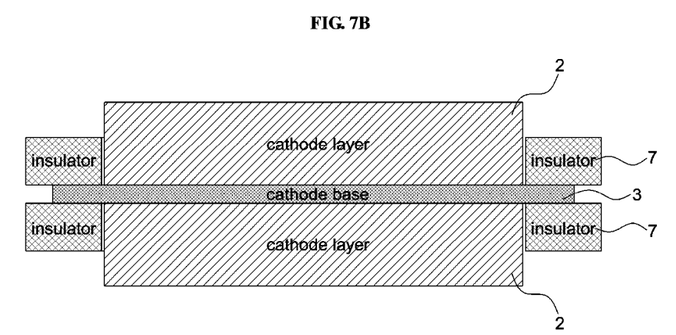

Next, as shown in FIG. 7B, first insulators 7 may be attached to the outer side or edges of the cathode layers 2. The first insulators 7 may be fixed on the cathode collector 3 or a base, and the thickness of the first insulators 7 may be determined in consideration of a change in thickness of the first insulators 7 and the cathode layer 2 by pressing. Preferably, the first insulators 7 may have a substantial thickness such that a dislocation may not be formed between the first insulators 7 and the cathode layers 2 after pressing.

Figure 7C:
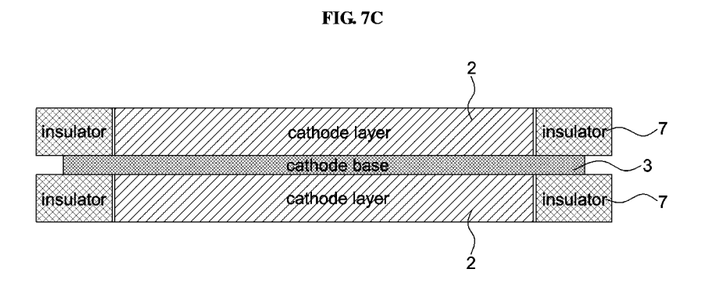

FIG. 7C shows pre-pressing that primarily presses the cathode layers 2 and the insulating layers. Preferably, the cathode layers 2 and the insulting layers may be pressed such that the layers may be leveled.

Figure 7D:
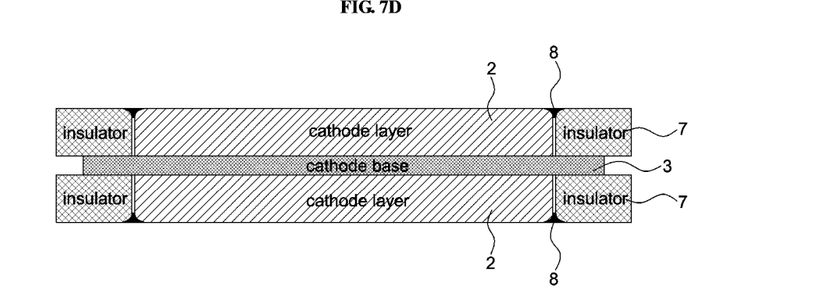

After the pre-pressing, as shown in FIG. 7D, second insulators 8 may be disposed between the cathode layers 2 and the first insulators 7. The second insulators 8 may include a polymer having low melting point and transition temperature in comparison to the first insulators 7.

Preferably, the second insulators 8 may be disposed as shown in FIG. 7D, by producing slurry including the second insulators 8, applying the slurry between the cathode layers 2 and the first insulator 7, and the drying it.

Alternatively, the second insulators 8 may be fabricated in a tape and then attach them between the cathode layers 2 and the first insulators 7.

Figure 7E:
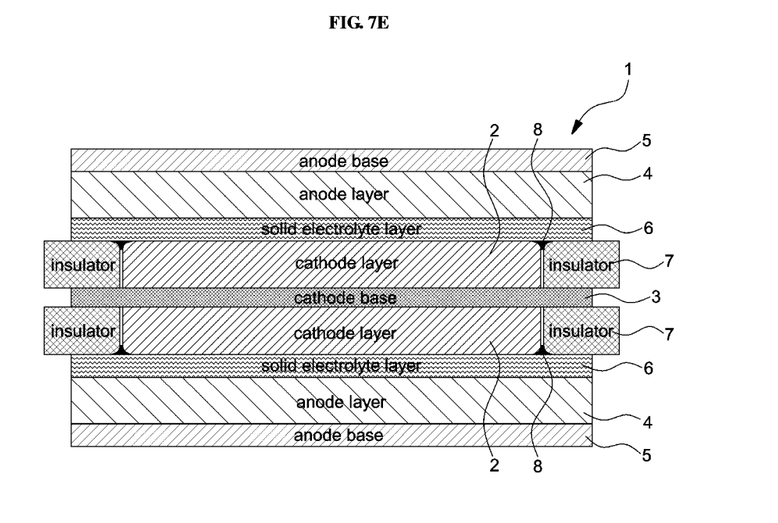

After the second insulators 8 are disposed at predetermined positions, as shown in FIG. 7E, solid electrolyte layers 6 and anode layers 4 may be stacked.

The anode layers 4 may be formed by coating with a cathode collector 5 as a base. For example, the anode layers 4 may be formed by coating a collector made of metal as a base with composite anode slurry and the composite anode slurry may include an anode active material that is generally used in secondary batteries such as silicon (Si), tin (Sn), and graphite. A cathode composite may suitably be a composite including an anode active material, a conductive material, and a binder, and preferably, such anode composite may be coated in a slurry state.

The solid electrolyte layers 6 may be formed by coating or laminating a solid electrolyte made of a sulfide-based or oxide-based material.

Figure 7F:
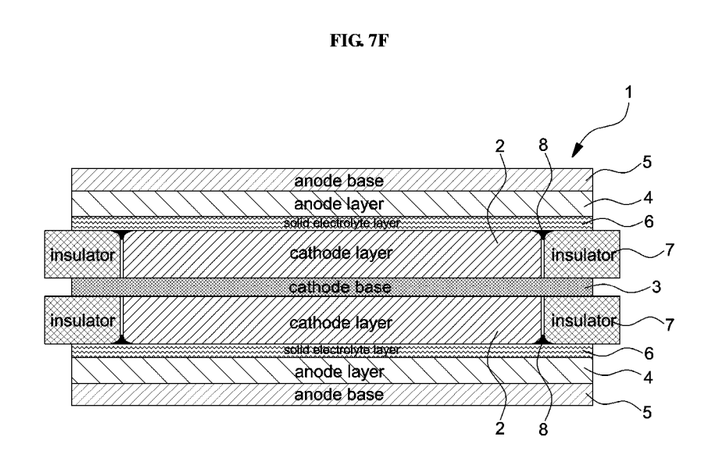

After the cathode layers 2, anode layers 4, and solid electrolyte layers 6 may be all stacked, main pressing may be performed, as shown in FIG. 7F. In the main pressing, the second insulators 8 may form membranes by deforming or melting and flowing into the gaps between the cathode layers 2 and the first insulators 7.

Accordingly, even if the solid electrolyte layers 6 collapse in pressing, direct contact between the cathode layers 2 and the anode layers 4 may be prevented by the second insulators 8, so a short-circuit in the battery can be prevented.

Although the preset invention was described with reference to embodiments, it should be understood that the present invention may be changed and modified in various ways by those skilled in the art without departing from the scope of the present invention. Further, specific situations or materials may be changed in various ways without departing from the necessary range of the present invention. Therefore, the present invention is not limited to the detailed specification based on embodiments and may include all embodiments within the claims.

What is claimed is:

1. A method of manufacturing an all-solid battery, comprising:
   forming a cathode layer;
   forming an anode layer having an area greater than an area of the cathode layer;
   forming a solid electrolyte layer between the cathode layer and the anode layer;
   disposing a first insulator at least an edge of the cathode layer;
   disposing a second insulator between the cathode layer and the first insulator;
   forming a battery cell by stacking the cathode layer, the anode layer, the solid electrolyte layer, the first insulator, and the second insulator; and
   forming a membrane of the second insulator between the cathode layer and the first insulator by pressing the battery cell.

2. The method of claim 1, wherein the second insulator is in contact with the first insulator, the cathode layer, and the solid electrolyte layer.

3. The method of claim 1, wherein a gap exists between the first insulator and the edge of the cathode layer, and at least a portion of the second insulator flows into the gap when the battery cell is pressed.

4. The method of claim 1, wherein the second insulator is disposed by applying a slurry comprising a second insulating material between the cathode layer and the first insulator.

5. The method of claim 1, wherein a second insulator is disposed by attaching a second insulating material formed in a tape between the cathode layer and the first insulator.

6. The method of claim 1, wherein the second insulator comprises a second insulating material having a melting point less than a melting point of the first insulator and a transition temperature less than a transition temperature of the first insulator.

7. The method of claim 6, wherein the second insulator comprises a polymer having a melting point of about 90° C. to 200° C. and the second insulator is pressed by cold isostatic pressing at room temperature.

8. The method of claim 6, wherein the second insulator comprises a polymer having a melting point of about 60° C. to 90° C. and the battery is pressed by a hot isostatic pressing at a temperature of about 90° C. or greater or by a warm isostatic pressing at a temperature of about 90° C. or less.

9. The method of claim 1, wherein the first insulator comprises one selected from the group consisting of polyimide, SBR (Styrene-Butadiene Rubber), Nafion (Tetrafluoroethylene), Teflon (Polytetrafluoroethylene, PEFE), PAA (Poly acrylic acid) and PVA (Poly vinyl alcohol), and the second insulator is made of one selected from a group consisting of polyethylene oxide (PEO), polyvinylidene fluoride (PVDF), and a polyvinylidene fluoride copolymer.

10. The method of claim 1, wherein the battery cell is pressed at temperature less than a melting point of the second insulator and greater than a transition temperature of the second insulator.

11. The method of claim 1, wherein the battery is pressed at temperature greater than a melting point of the second insulator.

12. An all-solid battery comprising:
a cathode layer,
an anode layer having an area greater than an area of the cathode layer,
a solid electrolyte layer disposed between the cathode layer and the anode layer,
a first insulator disposed at an edge of the cathode layer, and
a second insulator disposed between the cathode layer and the first insulator,
wherein the cathode layer, the anode layer, the solid electrolyte, the first insulator, and the second insulator are stacked to form a battery cell,
wherein a membrane of the second insulator is formed between the cathode layer and the first insulator by pressing the battery cell.

13. The all-solid battery of claim 12, wherein the second insulator is in contact with the first insulator, the cathode layer, and the solid electrolyte layer.

14. The all-solid battery of claim 12, wherein a gap exists between the first insulator and the edge of the cathode layer, and when the stacked battery is pressed, the second insulator is melted and at least a portion of the second insulator forms the membrane of the second insulator by flowing into the gap.

15. The all-solid battery of claim 12, wherein the second insulator comprise a second insulating material having a melting point less than a melting point of the first insulator and a transition temperature less than a transition temperature of the first insulator.

16. The all-solid battery of claim 15, wherein the melting point of the second insulator is greater than a temperature in the pressing and a transition temperature of the second insulator is less than the temperature in the pressing.

17. They battery of claim 15, wherein the melting point of the second insulator is less than the temperature in the pressing.

18. The all-solid battery of claim 12, wherein the first insulator comprises one selected from the group consisting of polyimide, SBR (Styrene-Butadiene Rubber), Nafion (Tetrafluoroethylene), Teflon (Polytetrafluoroethylene, PEFE), PAA (Poly acrylic acid) and PVA (Poly vinyl alcohol), and the second insulator is made of one selected from a group consisting of polyethylene oxide (PEO), polyvinylidene fluoride (PVDF), and a polyvinylidene fluoride copolymer.

19. A vehicle comprising an all-solid battery of claim 12.

* * * * *